x

US011861263B1

(12) United States Patent
Hunt et al.

(10) Patent No.: US 11,861,263 B1
(45) Date of Patent: Jan. 2, 2024

(54) ROBUST NATURAL LANGUAGE BASED CONTROL OF COMPUTER APPLICATIONS

(71) Applicant: X Development LLC, Mountain View, CA (US)

(72) Inventors: Thomas Hunt, Oakland, CA (US); David Andre, San Francisco, CA (US); Nisarg Vyas, Gujarat (IN); Rebecca Radkoff, San Francisco, CA (US); Rishabh Singh, San Jose, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 17/846,351

(22) Filed: Jun. 22, 2022

Related U.S. Application Data

(60) Provisional application No. 63/236,458, filed on Aug. 24, 2021.

(51) Int. Cl.
*G06F 3/0481* (2022.01)
*G06F 3/16* (2006.01)
*G06F 3/0484* (2022.01)
*G10L 15/22* (2006.01)

(52) U.S. Cl.
CPC ............ *G06F 3/167* (2013.01); *G06F 3/0481* (2013.01); *G06F 3/0484* (2013.01); *G10L 15/22* (2013.01)

(58) Field of Classification Search
CPC ........ G06F 21/564; G06F 21/88; G06F 16/29; G06F 21/577; G06F 21/60; G06F 11/3409; G06F 21/6245; G06F 3/0482; G06F 11/3013; G06F 11/3072; G06F 11/3466; G06F 16/909; G06F 21/31; G06F 21/562; G06F 2221/034; G06F 1/3212; G06F 11/0709; G06F 3/167; G06F 3/017; G06F 3/011; G06F 16/243; G06F 40/30; G06F 40/242; G06F 16/9535; G06F 3/0484; G06F 40/295; G06F 16/24578; G06F 16/3344; G06F 16/951; G06F 40/274; G06F 40/40; G06F 16/3329; G06F 3/013; G06F 16/176; G06F 16/2255; G06F 16/2365; G06F 16/24552

See application file for complete search history.

(56) References Cited

U.S. PATENT DOCUMENTS

| 2015/0178043 | A1* | 6/2015 | Yuan ..................... G06F 3/167 715/728 |
| 2015/0370787 | A1* | 12/2015 | Akbacak ............... G06F 40/47 704/2 |
| 2018/0061400 | A1* | 3/2018 | Carbune ............. G06F 16/3331 |
| 2018/0061401 | A1* | 3/2018 | Sarikaya .............. G06F 40/205 |
| 2018/0349447 | A1* | 12/2018 | MaCcartney ..... G06F 16/24578 |
| 2020/0342039 | A1* | 10/2020 | Bakir ................... G06F 16/9535 |
| 2021/0334320 | A1 | 10/2021 | Faust et al. |
| 2021/0398524 | A1* | 12/2021 | Gao .................... G10L 15/1815 |

\* cited by examiner

*Primary Examiner* — Rayeez R Chowdhury
(74) *Attorney, Agent, or Firm* — Gray Ice Higdon

(57) ABSTRACT

This specification is generally directed to techniques for robust natural language (NL) based control of computer applications. In many implementations, the NL control is at least selectively interactive in that the user feedback input is solicited, and received, in resolving action(s), resolving action set(s), generating domain specific knowledge, and/or in providing feedback on implemented action set(s). The user feedback input can be utilized in further training of machine learning model(s) utilized in the NL based control of the computer applications.

20 Claims, 7 Drawing Sheets

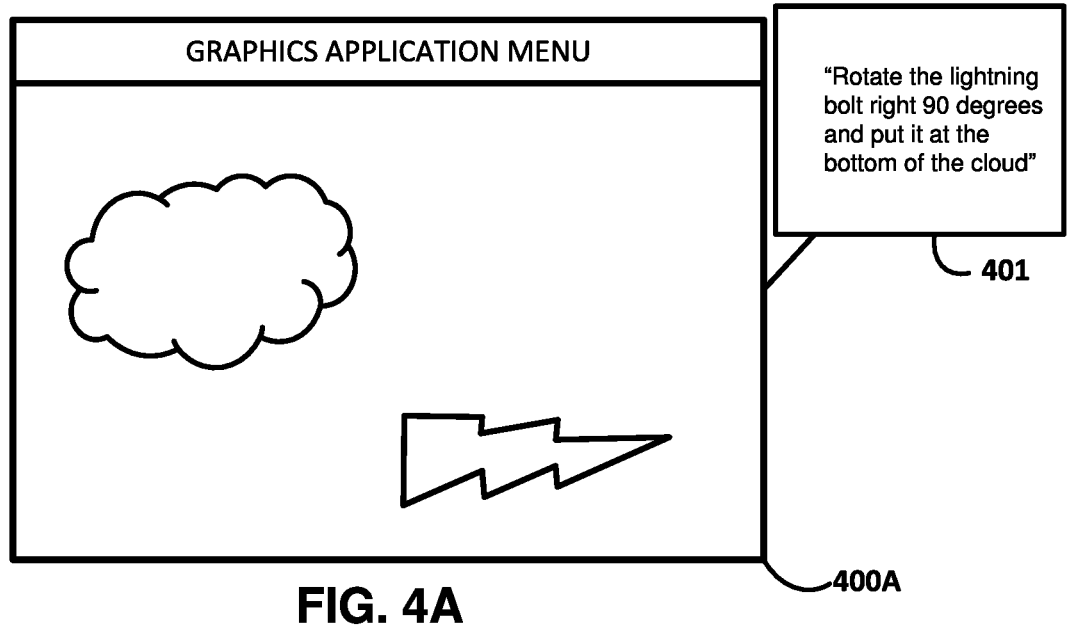
FIG. 4A
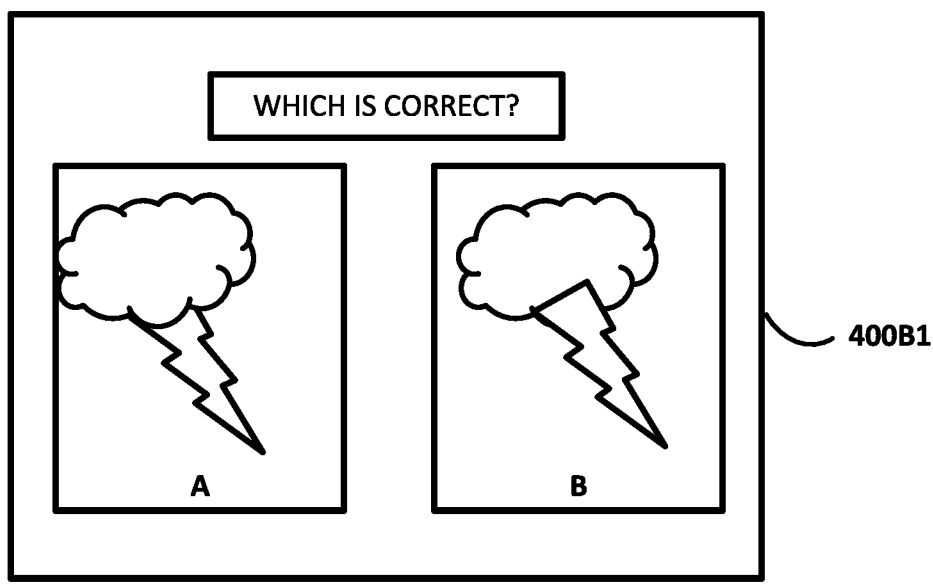
FIG. 4B1

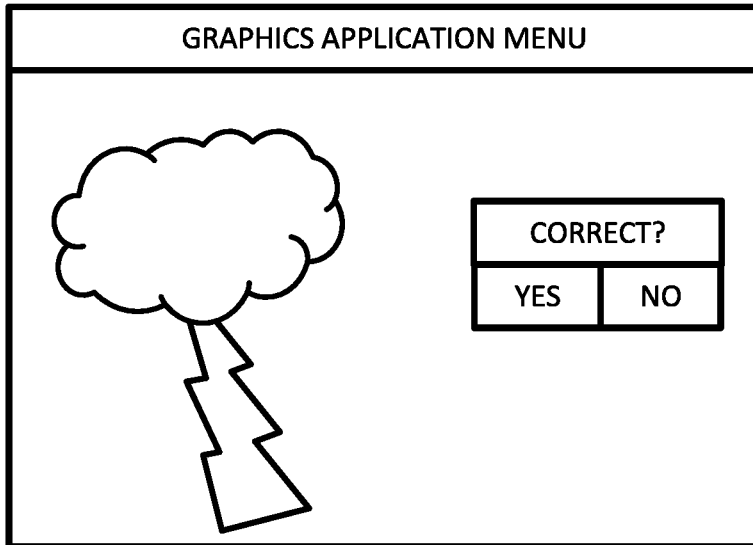
FIG. 4B2A
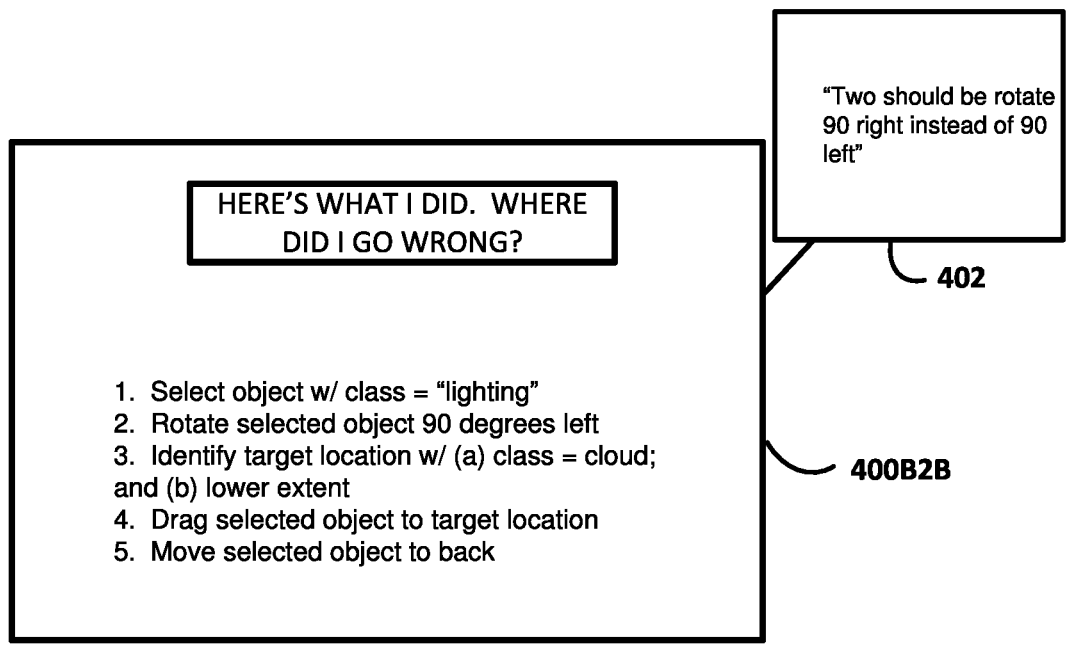
FIG. 4B2B

ROBUST NATURAL LANGUAGE BASED CONTROL OF COMPUTER APPLICATIONS

BACKGROUND

Voice based or other natural language based (e.g., typed free-form input) control of various computer applications has been proposed. However, such natural language based control of computer applications is often rigid, only supporting certain natural language inputs and certain corresponding control function(s). For example, a messaging application can support sending of an already composed message in response to user input of "send it", but can fail to support more complex user inputs such as "convert the bullet points to a numbered list, then send it" and/or can fail for other less complex user inputs that were not explicitly preconfigured by the application developer. Moreover, voice based control of the messaging application, while sending the message in response to user input of "send it", can fail to send the composed message in response to certain semantically equivalent variants of "send it", such as "go ahead and ship it out".

Further, such natural language based control requires the computer application to fully integrate the control function(s) to be enabled, which can require significant computational and labor overhead during application development, as well as computational overhead by the application during runtime. Additionally, requiring the computer application to fully integrate the control function(s) prevents new control function(s) from being automatically determined and/or defined based on user input(s). Yet further, such natural language based control can often result in erroneous action(s) being taken that do not comport with the intent(s) expressed by the natural language input.

SUMMARY

Implementations described herein relate to methods and apparatus for robust natural language (NL) based control of computer applications (also referred to herein as "applications"). Various computer applications can be controlled according to techniques disclosed herein, such as computer aided drafting (CAD) applications, animation applications, word processing applications, presentation applications, database frontend applications, spreadsheet applications, and/or other applications.

In controlling an application, a user can provide a free form NL input (e.g., a spoken utterance) that includes a request to control the application. As a working example, the application can be a CAD application and the NL input can be "make the blue line more curved", "make the beam 10% thicker", "make the threads deeper", or other NL input.

A request embedding can be generated based at least in part on the NL input. For example, text of the NL input (e.g., text generated by automatic speech recognition when the NL input is spoken input) can be processed using a large language model (LLM), or other machine learning model, to generate an NL embedding that is a lower dimensional semantic representation of the NL input. The request embedding can conform to the NL embedding or can be based on the NL embedding and additional embedding(s) (e.g., domain specific knowledge embedding(s) and/or current state embedding(s) described herein). The LLM model, or other machine learning model used in generating the NL embedding, can optionally be domain specific, where the domain can be a particular application (e.g., a particular CAD application), a class of applications (e.g., any CAD application or, more generally any visual manipulation application), or other domain.

In various implementations, the request embedding can additionally be generated based on domain specific knowledge and/or current state data for the application. For example, the NL input can be modified and/or supplemented, based on the domain specific knowledge, prior to processing of the NL input by the LLM model (i.e., the modified and/or supplemented NL input would be processed). For instance, a term in the NL input can be replaced by, or supplemented with, a domain specific definition for that term. As another example, domain specific knowledge that relates to term(s) of the NL input can be separately processed, using the LLM model or a separate machine learning model, to generate a domain specific knowledge embedding. That domain specific knowledge embedding can then be concatenated or otherwise combined with the NL embedding and/or a state embedding (e.g., processed along with, over an additional neural network, to generate a lower-dimensional embedding)—and the combined embedding used as the request embedding. As one particular instance, domain specific definition(s) for term(s) of the NL input can be separately processed to generate the domain specific knowledge embedding (e.g., a definition for "wicket" that is specific to the domain). As another particular instance, domain specific image(s) for term(s) of the NL input can be separately processed to generate the domain specific knowledge embedding (e.g., a picture of a "wicket" that is specific to the domain).

In various implementations, the domain specific knowledge can be supplemented based on user feedback that is provided responsive to prompts generated in response to certain NL inputs. For example, assume the user provided NL input of "move the widget closer to the hole" and that the current domain specific knowledge lacks any entry for "widget". In response to determining that the current domain specific knowledge lacks any entry for "widget", a prompt (s) can be generated that requests the user to provide input(s) that define what the user means by the term "widget". For example, the prompt can request the user to select an area, of the current display of the computer application, that is currently rendering the "widget", and a screenshot of that area utilized as a domain specific image of a "widget". As another example, an additional or alternative prompt can request the user to describe what a "widget" is, and that provided description utilized as a domain specific definition for "widget". Thereafter, when the user again provides NL input that includes "widget", it can be supplemented with the domain specific image and/or domain specific definition of "widget". In some implementations, the domain specific knowledge can additionally or alternatively be supplemented based on NL input(s) and without requiring prompt(s) and user feedback responsive to the prompt(s). As an example, assume again that the user provided NL input of "move the widget closer to the hole" and that the current domain specific knowledge lacks any entry for "widget". In response to determining that every recognized object currently rendered by the application, with the exception of a particular object, includes a corresponding domain specific name that is not "widget", it can be inferred that the particular object is the "widget". This inference that the particular object is the "widget" can be used to generate domain specific knowledge for "widget". For instance, a screenshot of an area of the display can be used as domain specific knowledge for "widget", based on that area of the display being the area that corresponds to the recognized particular object.

As another example of generating a request embedding, current state data can be separately processed, using a separate machine learning model, to generate a state data embedding, and that state data embedding concatenated or otherwise combined with the NL embedding and/or a domain specific knowledge embedding—and the combined embedding used as the request embedding. Current state data for the application reflects an immediate state and/or recent (e.g., within the last 5 seconds or other threshold duration) state(s) of the application. For example, the current state data can include a current screenshot of the computer application, data derived from the current screenshot of the computer application (e.g., position(s) of detected object(s), classification(s) for detected object(s)), and/or current state information provided by the computer application via an application programming interface (API).

The generated request embedding can be processed to determine one or more actions that can each potentially be used, alone or in combination with other action(s), to control the application in accordance with the request of the NL input. Each action is implementable through interaction with the application and, when implemented, can result in generated output (e.g., that is usable by another action) and/or can result in some control of the application. The control of the application can be through emulated input(s) (e.g., emulated touch input(s)) and/or via an API of the application. The actions can each include corresponding program code, such as code in JavaScript, Python, C++, or other programming language and/or can include API call(s). Some actions can be atomic or granular. One example of such an atomic action is "select object of class <X>", where "X" is a variable that can be populated based on term(s) of the NL input. Another example of an atomic action is "identify target location with <Y> property/properties", where Y is a variable that can be populated based on term(s) of the NL input. Yet another example of an atomic action is "drag selected object to <target location>", where <target location> is a variable that can be populated based on the output of the atomic action of "identify target location with <Y> property/properties". Further examples of atomic actions include "click rotate right 90 degrees button", "select all", and "delete"—each of which do not include any variables. As described herein, atomic actions can be composed together into an action set, and the application can be controlled based on the action set. Some actions can optionally include more coarse pre-composed sets of multiple atomic actions such as "select all and click rotate right 90 degrees button". An action set can also be composed of one or more "more coarse" actions, optionally along with atomic action(s).

In some implementations, in determining which actions can each potentially be used, the generated request embedding is processed over an action machine learning model (e.g., a transformer), to generate output that defines a distribution of measures (e.g., probabilities and/or other measure(s)) over candidate actions (e.g., atomic and/or more coarse actions). Further, multiple sets of actions can be generated based on the measures. For example, actions A1, A2, A7, and A8 can be selected for including in candidate sets of actions, based on those having the highest measures amongst candidate actions A1-A999. Optionally, one or more of the actions can be presented to the user, and user feedback utilized in resolving which action(s) to utilize in the set. For example, assume the user input is "rotate the screw 90 degrees", and a "rotate right 90 degree" action has a high measure and a "rotate left 90 degree" action also has a high measure. Based on those two actions conflicting and both having high measures, a prompt of "rotate right or left?" can be generated and presented to the user, and user feedback processed to determine which of those to eliminate from action set generation.

Continuing with the example, multiple action sets can be generated based on A1, A2, A7, A8, such as (but not limited to): {A1}; {A1, A2}; {A1, A2, A7}; {A1, A2, A7, A8}; {A2, A1, A7}, and {A8, A7, A1, A2}. Note that, in composing action sets, some action(s) can optionally have constraint(s) that constrain the action set(s) within which they can be included. For example, an action can have a constraint that it must be preceded by one or more particular actions (i.e., it can't be in an action set unless one of the particular actions precedes it). As another example, an action can have a constraint that it must be a terminal action of an action set. As yet another example, an action can have a constraint that it must be followed by one or more particular actions. As another example, an action can have a constraint that it must be a non-terminal action of an action set. Additional and/or alternative constraints can be specified. In some implementations, the constraint(s) can be specified by an application developer and/or based on input(s) of other user(s).

In some implementations, the multiple generated action sets can each be processed, using an action set machine learning model (e.g., a transformer), to generate output that defines a corresponding measure for the processed action set. Each action set can optionally be processed, using the action set machine learning model, along with the request embedding described above. The measures can be utilized to select a subset of the generated action sets as candidate action sets. For example, twenty action sets can be generated, but only those ten with the highest measures selected as candidate action sets. This can enable constraining of the quantity of simulations, and/or other analysis of the candidate action sets, to be performed. In some implementations, the action set machine learning model can be omitted (e.g., all generated action sets can be provided for simulation). In some of those implementations, the simulations based on the action set(s) can be used to determine (e.g., using suitability metric(s)) an action set to perform automatically or to present most prominently (e.g., as a "default") in a prompt that is rendered to the user and that seeks confirmation of an action set before performance. For example, the suitability metric(s) from simulation(s) can be used to select an action set that appears more natural (e.g., based on a final simulated state and/or other simulated state data) and/or that conforms most closely to the NL input(s). In some other implementations, the action set model and the action set machine learning model can optionally be combined into a single model that can be used to process the request embedding to generate output that defines a corresponding measure for each of multiple candidate action sets.

Once candidate action sets are generated, and prior to actual implementation of the candidate action sets in the computer application, a corresponding simulation of controlling the application can be performed for each of the candidate action sets. Based on the simulation, a subset of the candidate action sets can be selected. For example, one of the candidate action sets can be selected for automatically implementing and without requiring further input from the user. As another example, indication(s) of one or more of the candidate action set(s) can be presented to the user, and one of them implemented only when affirmative user interface input, directed to the one, is received in response to the presentation.

In selecting a subset based on the simulation, some candidate action set(s) can be eliminated from the selection based on their implementation resulting in an error (from the simulated application) during the simulation and/or based on their implementation violating predefined rule(s) for the application. In some implementations, violating predefined rule(s) may not result in elimination of a candidate action set but, instead, can negatively impact the suitability metric (described below) for the candidate action set. Of the remaining action sets, the subset can be selected based on simulated data from the simulations. For example, a suitability metric can be generated for each of the simulations. For instance, the suitability metric can be based on how closely the simulation conforms to the request of the NL input. As one example, a final state of the simulation can be processed to generate a NL description of the final state, and that NL description (e.g., an embedding thereof) compared to the NL input in generating the suitability metric (e.g., "closer" embeddings lead to better suitability metrics). For instance, a screenshot of the simulated final state can be processed using an image captioning model to generate the NL description. As another example, a video (e.g., series of screenshots) from the simulation can be processed to generate a NL description of the simulation, and that NL description compared to the NL input in generating the suitability metric. For example, each of the screenshots can be individually processed using a first machine learning model to generate a corresponding embedding, and the embeddings processed in a temporal sequence (e.g., the embeddings corresponding to the earliest in time screenshot processed first) using a second machine learning model (e.g., a transformer) to generate a NL description of the simulation and/or to generate an overall embedding that is semantically descriptive of the simulation. As another example, non visual (i.e., not an image and not a video) simulated data from the simulation can be processed to generate a NL description of the simulation, such as audio data from the simulation (e.g., generated by the simulated application during the simulation), text data from the simulation (e.g., generated by the simulated application during the simulation), and/or other data from the simulation. More generally, one or more instances of simulated data, that each reflects a corresponding state of the simulated application at a corresponding time instance, can be processed to generate one or more corresponding embeddings and/or other representation(s). Further, the generated embedding(s) and/or other representation(s) can be utilized in generating the suitability metric (e.g., by comparison to an NL input embedding and/or a request embedding).

As mentioned above, in some implementations or situations a single candidate action set can be selected for implementation, optionally after first receiving approval from the user. In some of those implementations it is selected based on having the best suitability metric and, optionally, it satisfying a threshold relative to the next best suitability metric. In some other implementations, two or more candidate action sets can be selected, and respective indications of each presented to the user. For example, a final screenshot from each can be presented to the user to enable the user to choose between the two, a natural language description of each can be presented to the user to enable the user to choose between the two, and/or other indication(s) of each can be presented. The one selected by the user, via user input, can then be implemented. Further, the one selected by the user can be utilized in generating a positive training example for supervised training of the action machine learning model described herein and/or in supervised training of the action set machine learning model described herein.

In some implementations, after an action set is implemented in controlling the computer application, a user interface output feedback prompt can be generated that reflects the actions of the given action set and the sequence of the actions in the given action set. The feedback prompt can be rendered to the user and user interface input in response to the user interface output feedback prompt. Further, training of the action machine learning model and/or of the action set machine learning model can be performed using the user interface input as a supervision signal. The feedback prompt can reflect each of the actions of the set, enabling the user to specify, in the feedback, more granular feedback than just "good" or "bad", which can lead to more efficient training of the action machine learning model and/or of the action set machine learning model. For example, the user can specify that the actions of the set should have been performed in an alternate sequence, that one action in the set was bad but the others were good, that one action in the set should have been replaced with an alternate particular action, etc. Additional and/or alternative forms of feedback from the user can be utilized.

The preceding is provided as a non-limiting overview of some implementations disclosed herein. These and other implementations are described in further detail herein.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

BRIEF DESCRIPTION OF THE DRAWINGS

FIG. 4A illustrates an example of a computer application and natural language user input provided to control the computer application.

FIG. 4B1 illustrates an example of providing a user interface output prompt that reflects aspects of two different action sets generated based on the natural language user input of FIG. 4A, and solicits the user to provide input to select one of the action sets.

FIG. 4B2A and FIG. 4B2B illustrate examples of providing user interface output feedback prompts based on an action set implemented automatically based on the natural language user input of FIG. 4A.

DETAILED DESCRIPTION

Figure 1:
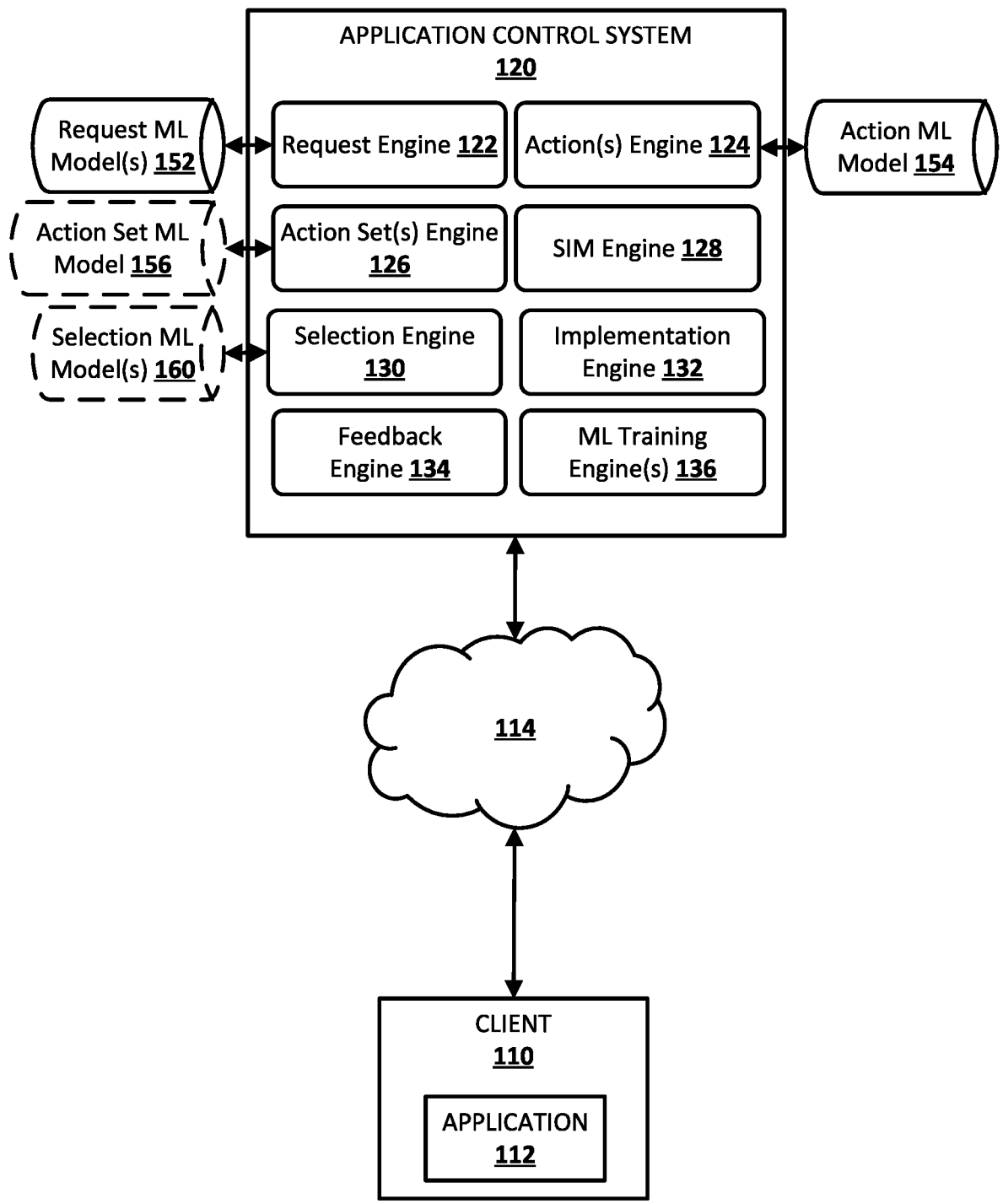
FIG. 1 is a diagram of an example environment in which implementations disclosed herein can be implemented.

FIG. 1 schematically depicts an example environment in which selected aspects of the present disclosure can be implemented, in accordance with various implementations. Any computing devices depicted in FIG. 1 or elsewhere in the figures can include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as application control system 120, can be implemented, in whole or in part, using one or more server computing devices that form what is sometimes referred to as a "cloud infrastructure," although this is not required.

The application control system 120 can be operably coupled with client computing device 110 (also referred to herein as "client") via one or more computer networks 114 to enable robust natural language control, via client 110, of one or more applications. For example, the application control system 120 can enable NL control of application 112 that is locally installed at the client 110 and/or of additional locally installed applications. As another example, the application control system 120 can enable NL control of cloud-based remote applications, that are utilized via interactions at the client 110 (e.g., controlling inputs are received at the client 110 and corresponding outputs are rendered at the client 110), but that may not be installed at the client 110 or that may only have a thin-client installed at the client 110.

Although application control system 120 is depicted in FIG. 1 as connected to the client 110 via the network(s) 114, in various implementations one or more aspects of control system 120 can be implemented locally at a client 110. For example, one or more of the engines of application control system 120 can be implemented at the client 110.

In various implementations, application control system includes a request engine 122, an action(s) engine 124, an action set(s) engine 126, a simulation (SIM) engine 128, a selection engine 130, an implementation engine 132, a feedback engine 134, and/or machine learning (ML) training engine(s).

In some implementations, the request engine 122 can interface with one or more request ML models, such as request ML model 152. For example, the request engine 122 can interface with each of multiple disparate request ML models (or sets of request ML models), and which request ML model (or set) it interfaces with in controlling a given application can be dependent on the given application. For example, the request ML model(s) 152 of FIG. 1 can be specific to a particular application, such as a particular CAD application or specific to a domain of applications, such as any CAD application—and can be used by the request engine 122 in response to corresponding user input being provided to control the particular application or an application within the domain of applications. For instance, the request ML model(s) 152 can be used (in lieu of others for other domains) based on NL input, for controlling the particular application, referencing the particular application and/or being provided when the particular application is executing or presented in the foreground when the NL input is received.

In some implementations, the action(s) engine 124 can interface with one or more action ML models, such as action ML model 154. For example, the action(s) engine 124 can interface with each of multiple disparate action ML models, and which action ML model it interfaces with in controlling a given application can be dependent on the given application. For example, the action ML model 154 of FIG. 1 can be specific to a particular application, such as a particular CAD application or specific to a domain of applications, such as any CAD application—and can be used by the action(s) engine 124 in response to corresponding user input being provided to control the particular application or an application within the domain of applications.

Yet further, in some implementations the action set(s) engine 126 can optionally interface with one or more action set ML models, such as action set ML model 156. For example, the action set(s) engine 126 can interface with each of multiple disparate action set ML models, and which action set ML model it interfaces with in controlling a given application can be dependent on the given application. For example, the action set ML model 156 of FIG. 1 can be specific to a particular application, such as a particular CAD application or specific to a domain of applications, such as any CAD application—and can be used by the action set(s) engine 126 in response to corresponding user input being provided to control the particular application or an application within the domain of applications.

Moreover, in some implementations the selection engine 130 can optionally interface with one or more selection ML models, such as selection ML model(s) 156. For example, the selection engine 130 can interface with each of multiple disparate selection ML models (or sets of ML model(s)), and which selection ML model it interfaces with in controlling a given application can be dependent on the given application. For example, the selection ML model(s) 156 of FIG. 1 can be specific to a particular application, such as a particular CAD application or specific to a domain of applications, such as any CAD application—and can be used by the selection engine 130 in response to corresponding user input being provided to control the particular application or an application within the domain of applications.

The machine learning models 152, 154, 156, and 160 can be of various architectures and trained in various manners. For example, one or more of the models can be a graph-based neural network (e.g., as a graph neural network (GNN), graph attention neural network (GANN), or graph convolutional neural network (GCN)), a sequence-to-sequence neural network such as a transformer, an encoder-decoder, or a recurrent neural network ("RNN", e.g., long short-term memory, or "LSTM", gate recurrent units, or "GRU", etc.), a BERT (Bidirectional Encoder Representations from Transformers). Also, for example, reinforcement learning, supervised learning, and/or imitation learning can be utilized in training one or more of the machine learning models. Additional description of some implementations of the machine learning models 152, 154, 156, and 160 is provided herein.

Figure 2:
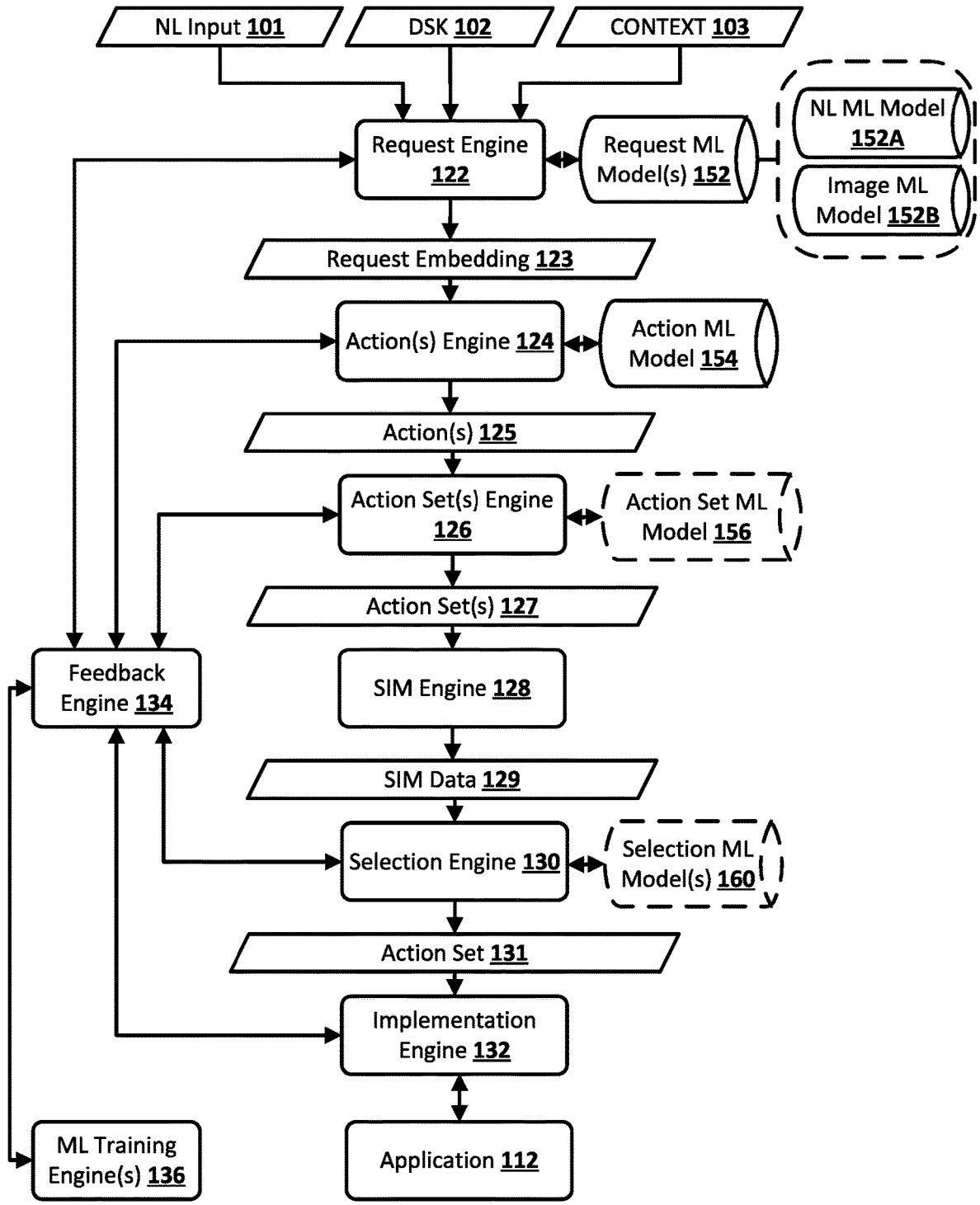
FIG. 2 schematically illustrates an example of how components of FIG. 1 can interact in enabling natural language control of computer applications.

Turning to FIG. 2, description is provided of examples of: the engines 122, 124, 126, 128, 130, 132, 134, and 136 of application control system 120; the interactions that can occur amongst those engines; and the models 152, 154, 156, and 160 that can be utilized by the application control system 120.

In FIG. 2, the request engine 122 processes at least NL input 101 in generating a request embedding 123. The NL input 101 is provided by a user, via interaction with user interface input device(s) of client device 110 (FIG. 1), and the NL input 101 includes a request to control a computer application (e.g., the application 112 of FIG. 1). For example, the NL input 101 can be spoken input, of the user, that is detected via microphone(s) of the client device 110, and the request engine 122 can process recognized text, generated based on the spoken input (e.g., using automatic speech recognition (ASR)), in generating the request embedding 123. As another example, the NL input 101 can be typed input provided via a virtual or hardware keyboard of the client 110, and the typed text can be processed by the request engine 122 in generating the request embedding 123. For instance, the recognized text or typed text can be processed using an NL ML model 152A of request ML model(s) 152, to generate an NL embedding. The NL ML model 152A can be, for example, an LLM. The request embedding 123 can be the NL embedding or can be a function of the NL embedding and other NL embeddings.

In some implementations, the request engine 122 additionally utilizes domain specific knowledge (DSK) 102 and/or context data 103 in generating the request embedding 123. For example, the request engine 122 can use the DSK 102 to alter the NL input 101, and process the alteration of the NL input 101 using the NL ML model 152 to generate an NL embedding. For instance, the NL input 101 can be "make the wicket 15% smaller", the request engine 122 can use the DSK 102 to find a domain specific (e.g., specific to a particular application or a class of applications) definition for "wicket" of "small door beside a larger door", and alter the NL input 101 to "make the small door 15% smaller" or to "make the wicket, the small door beside the larger door, 15% smaller". Continuing with the example, the request embedding can be the NL embedding, generated based on the alteration of the NL input 101, or can be a function of the NL embedding (generated based on the alteration) and other embedding(s).

As another example of using the DSK 102 in generating the request embedding 123, the request engine 122 can identify, from DSK 102, particular domain specific knowledge that relates to term(s) of the NL input 101. Further, the request engine 122 can process the particular domain specific knowledge using one or more of the request ML model(s) 152 to generate DSK embedding(s). The request engine 122 can then concatenate or otherwise combine the DSK embedding(s) with the NL embedding and/or a context embedding (e.g., processed along with, over an additional neural network, to generate a lower-dimensional embedding)—and the combined embedding used as the request embedding 123. For example, the NL input 101 can be "make the wicket 15% smaller", and the request engine 122 can generate an NL embedding based on the NL input 101 (unaltered). Further, the request engine 122 can identify, from DSK 102, a domain specific NL definition for "wicket" and/or can identify a domain specific image of a "wicket". The request engine 122 can process the domain specific NL definition for "wicket", using the NL ML model 152A to generate a domain specific NL definition embedding and/or can process the domain specific "wicket" image using the image ML model 152B to generate a domain specific image embedding. The request engine 122 can then generate the request embedding 123 as a function of the NL embedding and the domain specific NL definition embedding and/or the domain specific image embedding. The image ML model 152B can be, for example, a convolutional neural network (CNN) or other neural network trained to generate semantically rich embeddings of images based on processing of those images.

As indicated by the double arrow between the feedback engine 134 and the request engine 122, in some implementations the feedback engine 134 can selectively interact with the request engine 122 to solicit additional domain specific knowledge for the NL input 101. For example, if the request engine 122 determines that existing DSK 102 lacks any definition, image, and/or other information for term(s) of NL input 101, it can prompt feedback engine 134 to interact with the user in obtaining additional information. For example, the feedback engine 134 can generate audible and/or visual prompt(s), that request the user to provide input(s) that define what the user means by certain term(s) of the NL input 101, and can cause the prompt to be rendered via the client 110. For example, a prompt can request the user to select an area, of the current display of the computer application 112, that is currently rendering an object referenced by a term the NL input 101. In response to the user selecting a particular area in response to the prompt, a screenshot of that particular area can be utilized as a domain specific image of the object. As another example, an additional or alternative prompt can request the user to describe what the term is, and the user input provided in response can be utilized as a domain specific definition for the term. The feedback engine 134 can provide the domain specific image and/or the domain specific definition to the request engine 122 for use in generating the request embedding 123 for the current NL input 101. Optionally, the feedback engine 134 can also store the domain specific image and/or the domain specific definition, in association with the term and as part of DSK 102, for future use by the request engine 122 (e.g., for any future NL inputs for the domain and optionally from the same user).

As referenced above, the request engine 122 can optionally utilize context data 103 in generating the request embedding 123. For example, the context data 103 can include current state data for the application 112, the request engine 122 can process the current state data to generate current state embedding(s), and can generate the request embedding 123 as a function of the current state embedding(s). For instance, the current state data can include a current screenshot of the application 112, and the request engine 122 can process the current screenshot, using image ML model 152B, to generate a current state embedding. Also, for instance, the current state data can include an NL description of the current state of the application 112 (e.g., an NL description provided by the application 112 via an API), and the request engine 122 can process the NL description, using NL ML model 152A, to generate a current state embedding. Additional or alternative context 103 can be utilized in generating the context embedding(s), such as an indication of the particular application, an indication of a task currently being performed via the particular application, other current state data such as data derived from a current screenshot of the computer application, other application(s) that are executing on the client device along with the particular application, a current time of day or other current temporal data, a current location, and/or other context data.

The action(s) engine 124 processes the request embedding 123, using an action ML model 154, to select a subset of action(s) 125 from a corpus of candidate actions. For example, processing the request embedding 123 using the action ML model 154 can generate output that defines a corresponding measure for each of one or more actions of a corpus of candidate actions (e.g., atomic and/or more coarse actions). For instance, the output can define a probability distribution over the corpus of candidate actions, with each probability of the distribution reflecting a corresponding measure for a corresponding candidate action. The action(s) engine 124 can select the action(s) 125 based on the measure(s). For example, the action(s) engine 124 can select the ten, twenty, or other threshold quantity of action(s) 125 with the highest measures in the distribution. As another example, the action(s) engine 124 can select the action(s) 125 that have a corresponding measure that satisfies a threshold. As yet another example, the action(s) engine 124 can select up to N actions as the action(s) 125, but will only include, in the N actions, those that have the highest measures and that also have measures that satisfy a threshold. In some implementations, the action ML model 154 is a transformer network and/or can be trained, at least in part, in a supervised manner on past positive request embedding, action pairs. For example, the pairs can each include a request embedding paired with a positive ground truth indication of the action(s) that successfully resolved the corresponding request.

As indicated by the double arrow between the feedback engine 134 and the action(s) engine 124, in some implementations the feedback engine 134 can selectively interact with the action(s) engine 124 to solicit user feedback in selecting the action(s) 125. For example, the action(s) engine 124 can, based on a "rotate right 90 degree" action having a high measure and a conflicting "rotate left 90 degree" action also having a high measure, prompt the feedback engine 134 to interact with the user in resolving only one of those actions to include in the action(s) 125. For example, the feedback engine 134 can generate audible and/or visual prompt(s), that request the user to select between the two actions, and can cause the prompt to be rendered via the client 110. In response to user input that affirmatively selects one of the actions over the other, the selected action can be included amongst the action(s) 125 and the unselected action excluded from the action(s) 125.

When multiple actions are included amongst the action(s) 125, the action set(s) engine 126 optionally generates multiple action sets by composing different sequences and/or combinations of the actions. For example, if the action(s) 125 include A1, A2, A7, and A8, the action set(s) engine 126 can generate action sets such as (but not limited to): {A1}; {A1, A2}; {A1, A2, A7}; {A1, A2, A7, A8}; {A2, A1, A7}, and {A8, A7, A1, A2}. Note that, in composing action sets, the action set(s) engine 126 can operate within constraints of some action(s), such as constraint(s) for an action that constrain the action set(s) within which it can be included. For example, an action can have a constraint that it must be preceded by one or more particular actions, can have a constraint that it must be followed by one or more particular actions, and/or can have a constraint that it must be a non-terminal action of an action set. As another example, a coarse action can have a constraint that it cannot be included in an action set with any other actions.

In some implementations, the action set(s) engine 126 provides, as action set(s) 127 and to SIM engine 128, all of the generated action sets. In other implementations, the action set(s) engine 126 can provide, as action set(s) 127 and to SIM engine 128, only a subset of the generated action sets. In some of those other implementations, the action sets can each be processed, using action set ML model 156, to generate output that defines a corresponding measure for the processed action set. Each action set can optionally be processed, using action set ML model 156, along with the request embedding 123. The measures can be utilized to select a subset of the generated action sets to include in the action set(s) 127. For example, one hundred action sets can be generated, but only those twenty with the highest measures selected as candidate action sets. This can enable constraining of the quantity of simulations, and/or other analysis of the candidate action sets, to be performed. In some implementations, the action set ML model 156 is a transformer network and/or can be trained, at least in part, in a supervised manner on past training instances that each include training instance input of a corresponding action set (optionally along with a corresponding request embedding) and a training instance output that indicates whether the corresponding action set successfully resolved the corresponding request.

As indicated by the double arrow between the feedback engine 134 and the action set(s) engine 126, in some implementations the feedback engine 134 can selectively interact with the action set(s) engine 126 to solicit user feedback in selecting the action set(s) 127. For example, the action set(s) engine 126 can, based on a first action set having a high measure and a second action set also having a high measure (e.g., the first action set and the second action set have the two highest measures), prompt the feedback engine 134 to interact with the user in resolving only one of those action sets to include in the action set(s) 127. For example, the feedback engine 134 can generate audible and/or visual prompt(s), that request the user to select between the two action sets, and can cause the prompt to be rendered via the client 110. In response to user input that affirmatively selects one of the action sets over the other, the selected action set can be included amongst the action set(s) 127 and the unselected action set excluded from the action set(s) 127.

The SIM engine 128, for each of the action set(s) 127, simulates performance of controlling the application 112 using the action set. The SIM engine 128 can use, for example, an emulator in performing the simulations and can start each of the simulations from the current state of the application 112. The SIM engine 128 can perform multiple simulations in parallel to reduce latency. Further, the SIM engine 128 generates simulated data 129 for each of the simulations.

The simulated data 129 is provided to the selection engine 130 and the selection engine 130 uses the simulated data 129 to select, from the action set(s) 127, an action set 131 for actual implementation. For example, the selection engine 130 can select the action set 131 for automatic implementation and without first prompting the user for verification. As another example, the selection engine 130 can select the action set 131, but can first prompt the user for verification before implementing, and only implement the action set 131 if affirmative user input is received in response to the prompt. As another example, the selection engine 130 can first select a small (e.g., two, three, four, or five) subset of the action set(s) 127, and interact with the feedback engine 134 in prompting the user to select the action set 131 from amongst those of the subset. The subset can be selected based on suitability metrics for the action sets, described in more detail herein. Further, the selection engine 130 can determine whether to interact with the feedback engine 134 in prompting the user to select the action set, based on the suitability metrics. For example, a prompt can only be generated when the best suitability metric fails to satisfy a threshold and/or when two or more of the best suitability metrics are within a threshold of one another. As one particular instance of feedback, the feedback engine 134 can present a video, from simulation data 139, and for each action set, and prompt the user to select which most closely aligns with the NL input 101. Also, for instance, the feedback engine 134 can present a final screenshot, from simulation data 139, and for each action set, and prompt the user to select which most closely aligns with the NL input 101. Also, for instance, the feedback engine 134 can present a natural language prompt (e.g., an audible prompt) that describes each action set, and prompt the user to select which most closely aligns with the NL input 101. In various implementations, the feedback engine 134 can determine which format(s) to utilize for the prompt based on attributes of the action sets that are the focus of the prompt. For example, the feedback engine 134 can determine to include final screenshots in the prompt, but not videos, based on the action sets each including less than a threshold quantity of actions. As another example, the feedback engine 134 can determine to include videos in the prompt based on the action sets each including greater than a threshold quantity of actions. As yet another example, the feedback engine 134 can determine to include audible natural language output only in the prompt (i.e., no visual content) based on the final screenshot(s), from one or more of the simulations of the action sets, having less than a threshold amount of change relative to a current screenshot of the application 112 (i.e., no visible change was made to the application as a result of the simulation(s)).

In some implementations, the selection engine 130 eliminates some candidate action set(s) from being selected as the action set 131 based on their implementation, in simulation, resulting in an error (from the simulated application) during the simulation and/or based on their implementation violating predefined rule(s) for the application. In some implementations, violating predefined rule(s) may not result in elimination of a candidate action set but, instead, can negatively impact the suitability metric (described below) for the candidate action set.

In some additional or alternative implementations, the selection engine 130 selects the action set 131 based on it having the best suitability metric amongst suitability metrics for each of the action sets of the subset 131. The selection engine 130 can generate suitability metrics for an action set based on the SIM data 129 that is from the simulation using that action set. In some of those implementations, the selection engine 130 generates the suitability metric for an action set based on how closely, as indicated by the SIM data 129 for that action set, the simulation conforms to the request of the NL input. As one example, the selection engine 130 can process a final state of the simulation to generate an NL description of the final state, and that NL description (e.g., an embedding thereof) compared to the NL input (e.g., an embedding thereof—or the request embedding 123) in generating the suitability metric (e.g., "closer" embeddings lead to better suitability metrics). For instance, a screenshot of the simulated final state can be processed using an image captioning model, of selection ML model(s) 160, to generate the NL description. An embedding of that NL description can be compared to an embedding of the NL input 101 (optionally altered based on the DSK 102), and a distance between the two embeddings used as a suitability metric. As another example, a video (e.g., series of screenshots) from the simulation can be processed to generate a NL description of the simulation, and that NL description compared to the NL input 101 in generating the suitability metric.

The implementation engine 132 interacts with the application 112 in implementing the action set 131. The control of the application can be through emulated input(s) (e.g., emulated touch input(s)) and/or via an API of the application. In some implementations, after an action set 131 is implemented in controlling the application 112, the implementation engine 132 prompts the feedback engine 134 to generate a user interface output feedback prompt that reflects the actions of the action set 131 and the sequence of the actions in the given action set. The feedback engine 134 can cause the feedback prompt to be rendered to the user via the client. The feedback engine 134 can receive user interface input in response to the user interface output feedback prompt.

Further, training of the action ML model 154 and/or of the action set ML model 156 can be performed using the user interface input as a supervision signal. For example, the feedback engine 134 can provide, to the ML training engine(s) 136, an indication of the implemented action set, the user feedback, and the request embedding. Based on this data, the ML training engine(s) 136 can further train the action ML model 154 and/or the action set ML model 156. Further, it is noted that the ML training engine(s) 136 can additionally or alternatively further train these models based on other feedback received by the feedback engine 134. For example, feedback received from the feedback engine 134 through interaction with the action(s) engine 124 can be used to train the action ML model 154. As another example, feedback received from the feedback engine 134 through interaction with the action set(s) engine 126 can be used to train the action set ML model 156.

Figure 3:
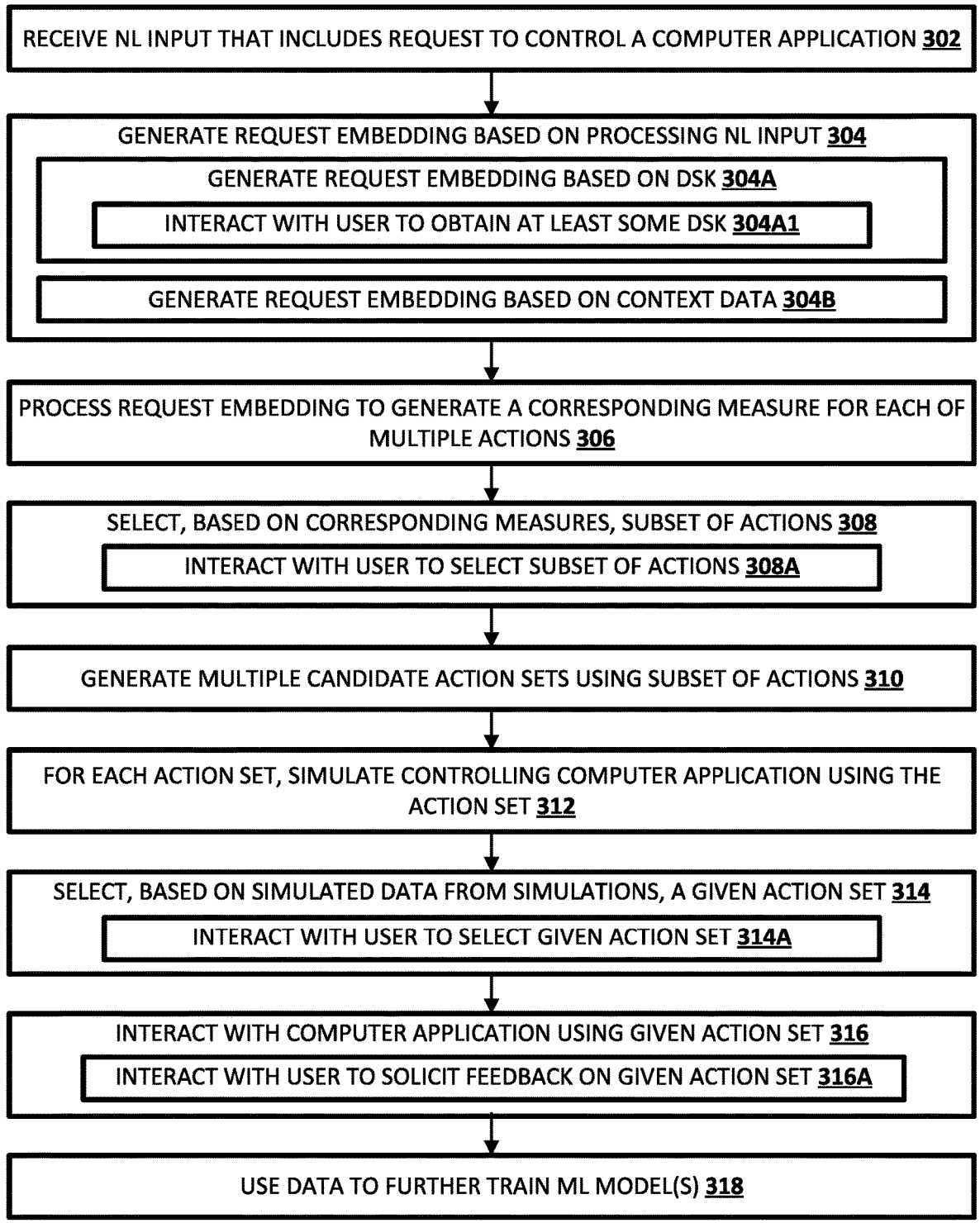
FIG. 3 is a flowchart illustrating an example method of practicing selected aspects of the present disclosure, according to implementations disclosed herein.

FIG. 3 is a flowchart illustrating an example method 300 for practicing selected aspects of the present disclosure, according to implementations disclosed herein. For convenience, the operations of the flow chart are described with reference to a system that performs the operations. This system may include various components of various computer systems, such as one or more components of application control system 120. Moreover, while operations of method 300 are shown in a particular order, this is not meant to be limiting. One or more operations may be reordered, omitted or added.

At block 302, the system receives NL input that includes a request to control a computer application.

At block 304, the system generates a request embedding based on processing the NL input. For example, the NL input (or an alteration based on DSK) can be processed using a LLM to generate an NL embedding, and the request embedding generated as a function of the NL embedding. Block 304 optionally includes sub-block 304A and/or sub-block 304B.

At sub-block 304A, the system generates the request embedding based on domain specific knowledge (DSK), such as pre-stored DSK. For example, the system can alter the NL input, with DSK, and generate the request embedding based on processing the altered NL input. As another example, the system can separately process DSK that is relevant to the NL input to generate domain specific embedding(s), and generate the request embedding as a function of an NL embedding from processing the NL input and as a function of the domain specific embedding(s).

Sub-block 304A optionally includes further sub-block 304A1, where the system interacts with the user to obtain at least some DSK. For example, the system can interact with the user to obtain at least some DSK in response to determining that there is no pre-stored DSK corresponding to one or more terms of the received NL input.

At sub-block 304B, the system generates the request embedding based on context data, such as current state data for the application. For example, the system can process the context data to generate context embedding(s), and generate the request embedding as a function of an NL embedding from processing the NL input and as a function of the context embedding(s).

At block 306, the system processes the request embedding to generate a corresponding measure for each of multiple actions. For example, the system can process the request embedding using a transformer, or other action ML model, to generate a measure distribution over the multiple actions.

At block 308, the system selects, based on the corresponding measures of block 306, a subset of the multiple actions.

In some implementations, block 308 includes sub-block 308A in which the system interacts with the user in selecting one or more of the actions for inclusion in the subset.

At block 310, the system generates multiple candidate action sets using the subset of actions selected at block 308.

At block 312, the system, for each of the action sets generated at block 310 (or a subset thereof selected using an action set ML model), simulates controlling a computer application using the action set.

At block 314, the system selects, based on simulated data from the simulations of block 312, a given action set. In some implementations, block 314 includes sub-block 314A in which the system interacts with the user in selecting the given action set.

At block 316, the system interacts with the computer application using the given action set. In some implementations, block 316 includes sub-block 316A in which the system interacts with the user, after the interaction with the computer application, to solicit feedback on the given action set.

At block 318, the system uses data, from the optional interactions of blocks 308A, 314A, and/or 316A to further train one or more of the ML model(s) 318 used in the method 300, such as an action ML model and/or an action set ML model described herein.

FIG. 4A illustrates an example of an interface 400A rendered by a computer application (e.g., application 112 of FIG. 1) on a client device (e.g., client device 110 of FIG. 1). The computer application is a graphics/drawing application and a cloud and a lightning bolt have been rendered in the application. The cloud and lightning bolt are rendered as a result of prior natural language input of a user and/or prior mouse and/or touch interactions. Further, in FIG. 4A the user has provided the NL input 401 of "rotate the lightning bolt right 90 degrees and put it at the bottom of the cloud".

FIG. 4B1 illustrates an example of providing a user interface output prompt, illustrated in interface 400B1, that reflects aspects of two different action sets generated based on the natural language user input of FIG. 4A, and solicits the user to provide input to select one of the action sets. For example, FIG. 4B1 is an example of an output that can be provided in sub-block 314A of method 300 of FIG. 3. More particularly, FIG. 4B1 illustrates (in "A") a final screenshot from a first simulation of a first action set and illustrates (in "B") a final screenshot from a second simulation of a second action set. The first action set and the second action set can include the same set of actions, except the first action set includes an action of "move selected lightning bolt object back", whereas the second action set does not include that action. FIG. 4B1 also illustrates a prompt, graphically (and optionally audibly) provided to the user of "which is correct". In response to the user selecting "A" (e.g., by tapping that area of the interface 400B1 or by saying "A" or "the left one"), the first action set can be implemented. Further, as described herein, the user's selection of "A" can be used as a positive signal, for the first action set, for further training of an action ML model and/or action set ML model described herein.

FIGS. 4B2A and 4B2B illustrate examples of providing user interface output feedback prompts based on an action set implemented automatically based on the natural language user input of FIG. 4A. For example, FIGS. 4B2A and 4B2B are examples of output that can be provided in sub-block 316A of method 300 of FIG. 3. More particularly, FIG. 4B2A illustrates an interface 400B2A of the graphics/drawing application after automatic implementation of an incorrect action set, along with a prompt of "correct?" and options for responding "yes" or "no" (e.g., by selecting or speaking one of the two options).

FIG. 4B2B illustrates a further interface 400B2B that can be rendered, in response to the user selecting "no" in FIG. 4B2A, to present details of the incorrect action set and enable the user to provide fine-grained input as to why it was incorrect. More particularly, the further interface 400B2B provides a natural language listing of the actions of the incorrect action set, and the order of those actions in the action set. The further interface 400B2B also prompts the user to specify what action(s) were errant. In response, the user provides NL input of "two should be rotate right 90 instead of 90 left". This fine-grained input can be used, for example, to generate a positive action set training example, for further training an action set ML model, that replaces "rotate selected object 90 degrees left" in step two with "rotate selected object 90 degrees right". This fine-grained input can additionally or be used to generate a training example, for training an action ML model, that includes a high measure for "rotate selected object 90 degrees right" and a low measure for "rotate selected object 90 degrees left".

Figure 5A:
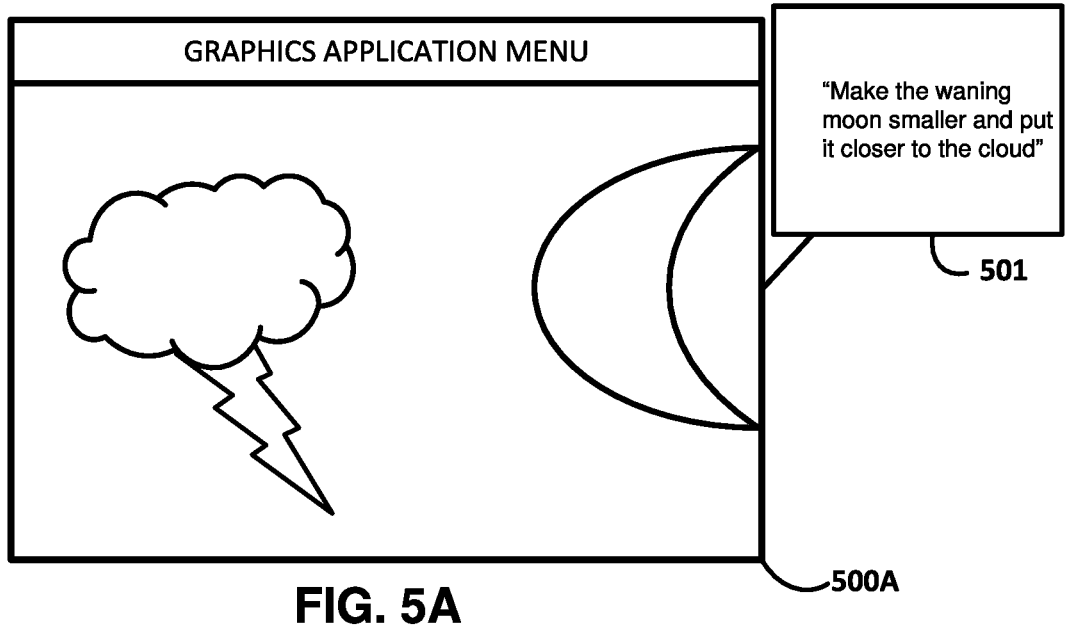
FIG. 5A illustrates another example of a computer application and natural language user input provided to control the computer application.

FIG. 5A illustrates another interface 500A rendered by a computer application (e.g., application 112 of FIG. 1) on a client device (e.g., client device 110 of FIG. 1). The computer application is a graphics/drawing application and a cloud, a lightning bolt, and a moon have been rendered in the application. The cloud, lightning bolt, and moon are rendered as a result of prior natural language input of a user and/or prior mouse and/or touch interactions. Further, in FIG. 5A the user has provided the NL input 501 of "make the waning moon smaller and put it closer to the cloud".

Figure 5B:
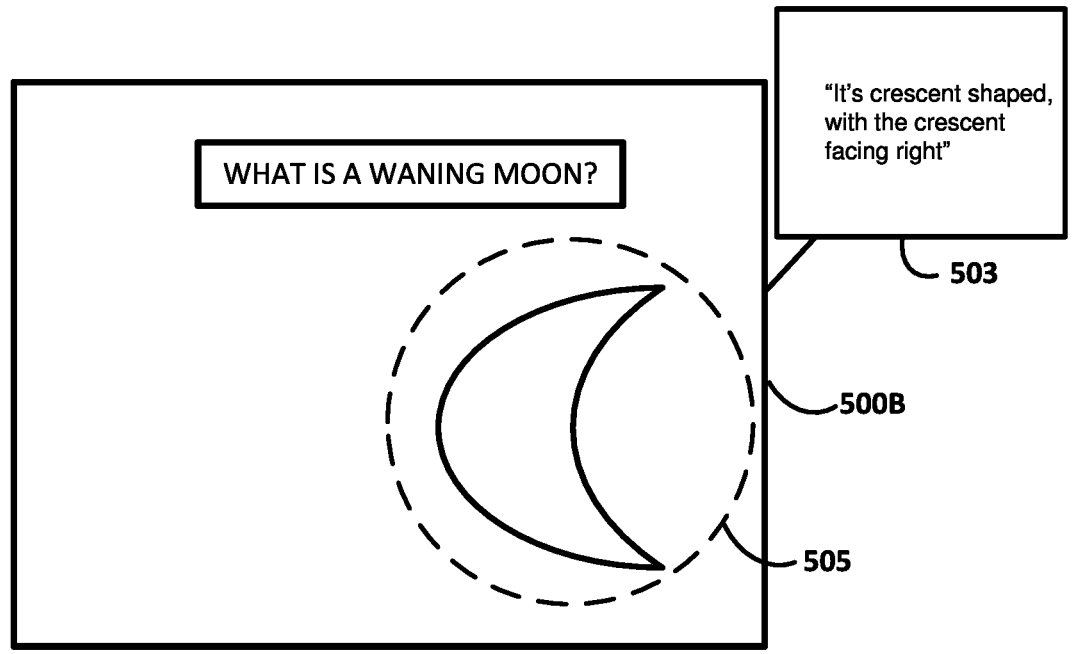
FIG. 5B illustrates an example of providing a user interface output prompt that solicits additional detail on the natural language input of FIG. 5A.

FIG. 5B illustrates, in interface 500B, an example of providing a user interface output prompt that solicits additional detail on the natural language input of FIG. 5A. For example, FIG. 5B is an example of an output that can be provided in further sub-block 304A1 of method 300 of FIG. 3. More particularly, FIG. 5B illustrates a prompt of "what is a waning moon", that solicits further details on the term "waning moon" from the NL input 501. In response, the user can provide touch input 505 that encircles the "waning moon" and/or can provide NL input 503 that defines the "waning" moon. An image, based on the touch input 505, can then be used as DSK and/or the definition provided in NL input 503 can then be used as DSK.

Figure 6:
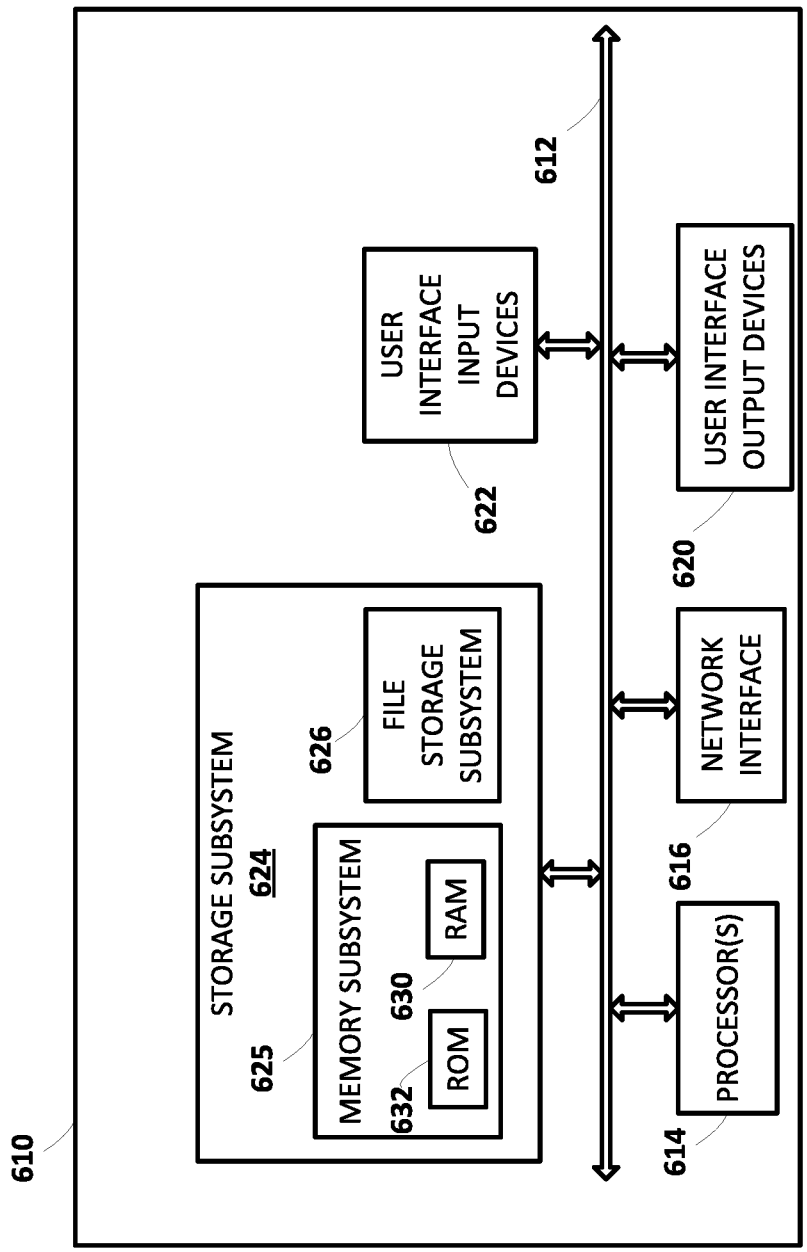
FIG. 6 illustrates an example architecture of a computing device.

FIG. 6 is a block diagram of an example computing device 610 that may optionally be utilized to perform one or more aspects of techniques described herein. In some implementations, the client device 110, the application control system 120, and/or other component(s) can comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touch screen incorporated into the display, audio input devices such as voice recognition systems, microphones, and/or other types of input devices.

In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 300 of FIG. 3 and/or other methods described herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is provided and includes receiving natural language input that includes a request to control a computer application. The method further includes generating, based on processing the natural language input, a request embedding. The method further includes processing the request embedding to generate a corresponding measure for each of multiple actions. Each of the actions is optionally specific to a domain of the computer application and is implementable through interaction with the computer application. The method further includes generating, based on the corresponding measures, multiple candidate action sets. Each of the candidate action sets includes a respective one of the actions or a respective ordered sequence of multiple of the actions. Further, each of the action sets is unique relative to all other of the action sets. The method further includes, for each of the candidate action sets: performing a simulation of controlling the computer application using the candidate action set; and generating, based on simulated data from the simulation, a suitability metric for the candidate action set. The method further includes selecting, from the candidate action sets and based on the suitability metrics, a given action set. The method further includes interacting with the computer application to control the computer application using the selected given action set.

These and other implementations of the technology disclosed herein can optionally include one or more of the following features.

In some implementations, generating the suitability metric for the given action set includes: processing at least some of the simulated data, from the simulation using the given action set, to generate natural language output that describes the processed at least some of the simulated data; comparing the natural language output to the natural language input; and generating the suitability metric based on the comparing. In some versions of those implementations, the natural language output is natural language text or a natural language embedding. In some additional or alternative versions of those implementations, at least some of the simulated data includes a screenshot of a final state, of the computer application, from the simulation using the given action. In yet additional or alternative versions of those implementations, generating the suitability metric for the given action set further includes: determining that the simulation of controlling the computer application, using the given action set, does not cause any error of the computer application to be generated during the simulation and/or does not violate any rules defined for the computer application; and in response to determining that the simulation, using the given action set, does not cause any error and/or does not violate any rules: positively influencing the suitability metric for the given action, or refraining from negatively influencing the suitability metric for the given action.

In some implementations, generating the suitability metric for an additional action set, of the action sets, includes: determining that the simulation of controlling the computer application, using the additional action set, causes an error of the computer application to be generated during the simulation. In some of those implementations, the method further includes, in response to determining that the simulation, using the additional action set, causes the error: generating the suitability metric, for the action, as a minimum value suitability metric.

In some implementations, generating the suitability metric for an additional action set, of the action sets, includes: determining that the simulation of controlling the computer application, using the additional action set, violates one or more rules defined for the computer application. In some of those implementations, the method further includes, in response to determining that the simulation, using the additional action set, violates the one or more rules: negatively influencing the suitability metric for the given action.

In some implementations, generating the request embedding includes: generating a natural language embedding based on processing the natural language input using a language model; and generating the request embedding based on the natural language embedding. In some versions of those implementations, the method further includes, prior to processing the natural language input using the language model: modifying and/or supplementing the natural language input using one or more terms from a domain specific knowledge base for the computer application. In some additional or alternative version of those implementations, generating the request embedding further includes: generating a current state embedding based on processing current state data that reflects a current state of the computer application; and generating the request embedding further based on the current state embedding. The current state data could include, for example, a current screenshot of the computer application, data derived from the current screenshot of the computer application, and/or current state information provided by the computer application via an application programming interface.

In some implementations, the given action set includes: a first group of the actions in a first sequence and the action sets further include an additional action set that includes: the first group of the actions in a second sequence; or a second group of the actions in a third sequence.

In some implementations, interacting with the computer application to control the computer application using the given action set is automatically performed, is automatically performed in response to the natural language input, and is automatically performed without requiring any further input from the user after providing the natural language input. In some of those implementations, the method further includes: determining that the suitability metric, for the given action set, satisfies an automatic performance threshold; and automatically performing the interacting with the computer application in response to the suitability metric, for the given action set, satisfying the threshold.

In some implementations, the method further includes, prior to interacting with the computer application to control the computer application using the given action set: providing a user interface output prompt, that reflects one or more aspects of the given action set; receiving affirmative user interface input in response to providing the user interface output prompt; and in response to receiving the affirmative user interface input, interacting with the computer application to control the computer application using the given action set. In some versions of those implementations, the user interface output that reflects one or more aspects of the given action set includes: a final simulated state screenshot, from the simulated data from the simulation using the given action set; a video from the simulated data from the simulation using the given action set; natural language output that describes one or more interactions from implementing the given action set, and/or underlying code for the given action set. In some additional or alternative versions of those implementations, the method further includes: determining that the suitability metric, for the given action set, fails to satisfy an automatic performance threshold; and providing the user interface prompt in response to the suitability metric, for the given action set, failing to satisfy the threshold.

In some implementations, processing the request embedding to generate the corresponding measure for each of the multiple actions comprises processing the request embedding, using a trained machine learning model, to generate the corresponding measures. In some versions of those implementations, the method further includes, subsequent to interacting with the computer application to control the computer application using the given action set: providing a user interface output feedback prompt that reflects the actions of the given action set and the sequence of the actions in the given action set; receiving user interface input in response to the user interface output feedback prompt; and performing training, of the machine learning model, using the user interface input as a supervision signal. In some versions of those implementations, the method further includes determining that the user interface input indicates an alternate sequence that varies from the sequence and/or an alternate action for at least one of the actions. In some of those versions, performing training, of the machine learning model, using the user interface input as the supervision signal includes, in response to determining that the user interface input indicates the alternate sequence and/or the alternate action: performing supervised training, of the machine learning model, using positive supervision data that includes the alternate sequence and/or the alternate action.

In some implementations, a method implemented by one or more processors is provided and includes receiving natural language input, that includes a request to control a computer application, and generating a request embedding based on processing the natural language input. The method further includes processing the request embedding to determine at least a first candidate action set and a second candidate action set. The first candidate action set includes a first group of the actions in a first sequence. The second candidate action set includes the first group of the actions in a second sequence or a second group of the actions in a third sequence. Each of the actions is implementable through interaction with the computer application. The method further includes performing a first simulation of controlling the computer application using the first candidate action set and performing a second simulation of controlling the computer application using the second candidate action set. The method further includes generating user interface output that is based on first simulated data from the first simulation and second simulated data from the second simulation. The method further includes causing the user interface output to be rendered in response to receiving the natural language input. The method further includes receiving user interface input in response to rendering the user interface output and determining, based on the user interface input, to select the first candidate action set in lieu of at least the second candidate action set. The method further includes, in response to determining to select the first candidate action set, interacting with the computer application to control the computer application using the first candidate action set.

These and other implementations of the technology disclosed herein can optionally include one or more of the following features.

In some implementations, the user interface output includes: a final simulated state screenshot, from the first simulated data from the first simulation and/or a second simulated state screenshot, from the second simulated data from the second simulation. In some implementations, the user interface output additionally or alternatively includes a first video, from the first simulated data from the first simulation and/or a second video, from the second simulated data from the second simulation. In some implementations, the user interface output additionally or alternatively includes first natural language output that is generated based on the first simulated data and that describes one or more aspects of the first simulation, and/or second natural language output that is generated based on the second simulated data and that describes one or more aspects of the second simulation. In some of those implementations, the first natural language output is audible output and the second natural language output is audible output.

In some implementations, generating the user interface output includes selecting, based on one or more attributes of the first candidate action set and/or the second candidate action set, a format for the user interface output, and generating the user interface output in conformance with the selected format.

In some implementations, generating the user interface output includes selecting, based on one or more attributes of the first simulated data and/or the second simulated data, a format for the user interface output, and generating the user interface output in conformance with the selected format.

In some implementations, processing the request embedding to determine at least the first candidate action set and the second candidate action set includes: generating, based on processing the request embedding using a machine learning model, a corresponding measure for each of the multiple actions; generating the first candidate action set based on the corresponding measures for the first group of actions; and generating the second candidate action set based on the corresponding measures for the second group of actions.

In some implementations, the method further includes: generating, based on the first simulated data from the first simulation, a first suitability metric for the first candidate action set; and generating, based on the second simulated data from the second simulation, a second suitability metric for the second candidate action set. In some of those implementations, generating the prompt and/or causing the prompt to be rendered is based on the first suitability metric and the second suitability metric.

In some implementations, the method further includes, subsequent to interacting with the computer application to control the computer application using the first candidate action set, and in response to determining to select the first candidate action set: performing training, of the machine learning model, using the first candidate action set as a supervision signal.

In some implementations, a method implemented by one or more processors is provided and includes receiving natural language input, that includes a request to control a computer application, and generating a request embedding based on processing the natural language input. The method further includes generating, based on processing the request embedding using a machine learning model, a corresponding measure for each of multiple actions that are each implementable through interaction with the computer application. The method further includes selecting a given action based on the corresponding measure for the given action and generating user interface output, that is based on the given action and that prompts for confirmation of one or more aspects of the given action. The method further includes causing the user interface output to be rendered in response to receiving the natural language input and receiving user interface input in response to rendering the user interface output. The method further includes determining, based on the user interface input, to select the given action or a refinement of the given action. The method further includes, in response to determining to select the given action or the refinement: generating an action set that includes the given action or the refinement, and includes one or more additional actions; and interacting with the computer application to control the computer application using the action set.

These and other implementations of the technology disclosed herein can optionally include one or more of the following features.

In some implementations, the method further includes performing a simulation of controlling the computer application using the action set. In some versions of those implementations, interacting with the computer application is in response to the simulation satisfying one or more criteria. In some of those versions, the one or more criteria include that a suitability measure, generated based on simulated data from the simulation, satisfies a threshold.

What is claimed is:

1. A method implemented by one or more processors, the method comprising:
    receiving natural language input that includes a request to control a computer application;
    generating a request embedding, generating the request embedding being based on processing the natural language input;
    processing the request embedding to generate a corresponding measure for each of multiple actions, each of the actions being specific to a domain of the computer application and being implementable through interaction with the computer application;
    generating, based on the corresponding measures, multiple candidate action sets for the request, each of the candidate action sets including a respective one of the actions or a respective ordered sequence of multiple of the actions, and each of the action sets being unique relative to all other of the action sets;
    for each of the candidate action sets for the request, and prior to any interacting, responsive to the request, with the computer application to control the computer application:
        performing a simulation of controlling the computer application using the candidate action set, and
        generating, based on simulated data from the simulation, a suitability metric for the candidate action set;
    prior to any interacting, responsive to the request, with the computer application to control the computer application, automatically selecting, from the candidate action sets and based on the suitability metrics, a given action set for utilization responsive to the request; and
    interacting with the computer application to control the computer application using the selected given action set.

2. The method of claim 1, wherein generating the suitability metric for the given action set comprises:
    processing at least some of the simulated data, from the simulation using the given action set, to generate natural language output that describes the processed at least some of the simulated data;
comparing the natural language output to the natural language input; and
generating the suitability metric based on the comparing.

3. The method of claim 2, wherein the natural language output is natural language text or a natural language embedding.

4. The method of claim 2, wherein the at least some of the simulated data comprises a screenshot of a final state, of the computer application, from the simulation using the given action.

5. The method of claim 2, wherein generating the suitability metric for the given action set further comprises:
determining that the simulation of controlling the computer application, using the given action set, does not cause any error of the computer application to be generated during the simulation and/or does not violate any rules defined for the computer application; and
in response to determining that the simulation, using the given action set, does not cause any error and/or does not violate any rules:
positively influencing the suitability metric for the given action, or
refraining from negatively influencing the suitability metric for the given action.

6. The method of claim 1, wherein generating the suitability metric for an additional action set, of the action sets, comprises:
determining that the simulation of controlling the computer application, using the additional action set, causes an error of the computer application to be generated during the simulation; and
in response to determining that the simulation, using the additional action set, causes the error:
generating the suitability metric, for the action, as a minimum value suitability metric.

7. The method of claim 1, wherein generating the suitability metric for an additional action set, of the action sets, comprises:
determining that the simulation of controlling the computer application, using the additional action set, violates one or more rules defined for the computer application; and
in response to determining that the simulation, using the additional action set, violates the one or more rules:
negatively influencing the suitability metric for the given action.

8. The method of claim 1, wherein generating the request embedding comprises:
generating a natural language embedding based on processing the natural language input using a language model; and
generating the request embedding based on the natural language embedding.

9. The method of claim 8, further comprising, prior to processing the natural language input using the language model:
modifying and/or supplementing the natural language input using one or more terms from a domain specific knowledge base for the computer application.

10. The method of claim 8, wherein generating the request embedding further comprises:
generating a current state embedding based on processing current state data, wherein the current state data reflects a current state of the computer application; and
generating the request embedding further based on the current state embedding.

11. The method of claim 10, wherein the current state data comprises:
a current screenshot of the computer application,
data derived from the current screenshot of the computer application, and/or
current state information provided by the computer application via an application programming interface.

12. The method of claim 1, wherein the given action set includes a first group of the actions in a first sequence, and wherein an additional action set, of the action sets, includes the first group of the actions in a second sequence or a second group of the actions in a third sequence.

13. The method of claim 1, wherein interacting with the computer application to control the computer application using the given action set is automatically performed, is automatically performed in response to the natural language input, and is automatically performed without requiring any further input from the user after providing the natural language input.

14. The method of claim 13, further comprising:
determining that the suitability metric, for the given action set, satisfies an automatic performance threshold; and
automatically performing the interacting with the computer application in response to the suitability metric, for the given action set, satisfying the threshold.

15. The method of claim 1, further comprising, prior to interacting with the computer application to control the computer application using the given action set:
providing a user interface output prompt, that reflects one or more aspects of the given action set;
receiving affirmative user interface input in response to providing the user interface output prompt; and
in response to receiving the affirmative user interface input, interacting with the computer application to control the computer application using the given action set.

16. The method of claim 15, wherein the user interface output that reflects one or more aspects of the given action set comprises:
a final simulated state screenshot, from the simulated data from the simulation using the given action set,
a video from the simulated data from the simulation using the given action set,
natural language output that describes one or more interactions from implementing the given action set, and/or
underlying code for the given action set.

17. The method of claim 15, further comprising:
determining that the suitability metric, for the given action set, fails to satisfy an automatic performance threshold; and
providing the user interface prompt in response to the suitability metric, for the given action set, failing to satisfy the threshold.

18. The method of claim 1, wherein processing the request embedding to generate the corresponding measure for each of the multiple actions comprises processing the request embedding, using a trained machine learning model, to generate the corresponding measures.

19. The method of claim 18, further comprising, subsequent to interacting with the computer application to control the computer application using the given action set:
providing a user interface output feedback prompt that reflects the actions of the given action set and the sequence of the actions in the given action set;

receiving user interface input in response to the user interface output feedback prompt; and performing training, of the machine learning model, using the user interface input as a supervision signal.

20. A method implemented by one or more processors, the method comprising:

receiving natural language input that includes a request to control a computer application;

generating a request embedding, generating the request embedding being based on processing the natural language input;

processing the request embedding to determine at least a first candidate action set for the request and a second candidate action set for the request, the first candidate action set including a first group of the actions in a first sequence, and the second candidate action set including the first group of the actions in a second sequence or a second group of the actions in a third sequence, wherein each of the actions is implementable through interaction with the computer application;

prior to any interacting, responsive to the request, with the computer application to control the computer application:

performing a first simulation of controlling the computer application using the first candidate action set;

performing a second simulation of controlling the computer application using the second candidate action set;

generating user interface output that is based on first simulated data from the first simulation and second simulated data from the second simulation;

causing the user interface output to be rendered in response to receiving the natural language input;

receiving user interface input in response to rendering the user interface output; and determining, based on the user interface input, to automatically select the first candidate action set in lieu of at least the second candidate action set; and in response to the request and in response to determining to automatically select the first candidate action set:

interacting with the computer application to control the computer application using the first candidate action set.

* * * * *